(12) United States Patent
Schmidt et al.

(10) Patent No.: US 10,914,301 B2
(45) Date of Patent: Feb. 9, 2021

(54) REFRIGERANT COMPRESSOR

(71) Applicant: BITZER Kuehlmaschinenbau GmbH, Sindelfingen (DE)

(72) Inventors: Henrik Thomsen Schmidt, Sonderborg (DK); Dieter Hildebrandt, Appen (DE); Andre Beier, Bad Lauchstaedt (DE)

(73) Assignee: BITZER Kuchlmaschinenbau GmbH, Sindelfingen (DE)

( * ) Notice: Subject to any disclaimer, the term of this patent is extended or adjusted under 35 U.S.C. 154(b) by 0 days.

(21) Appl. No.: 15/485,955

(22) Filed: Apr. 12, 2017

(65) Prior Publication Data

US 2017/0218944 A1    Aug. 3, 2017

Related U.S. Application Data

(63) Continuation of application No. PCT/EP2015/073551, filed on Oct. 12, 2015.

(30) Foreign Application Priority Data

Oct. 13, 2014    (DE) .......................... 10 2014 114 837

(51) Int. Cl.
   *F04B 49/06*        (2006.01)
   *F04B 35/04*        (2006.01)
   (Continued)

(52) U.S. Cl.
   CPC .............. *F04B 49/06* (2013.01); *F04B 35/04* (2013.01); *F04B 39/121* (2013.01);
   (Continued)

(58) Field of Classification Search
   CPC ........ F04B 39/121; F04B 49/06; F04B 35/04; H02K 5/225; F04C 2270/01;
   (Continued)

(56) References Cited

U.S. PATENT DOCUMENTS 2,011,062 A    8/1935    Masamitsu
2,015,000 A    9/1935    Beringer
(Continued)

FOREIGN PATENT DOCUMENTS

DE    25 00 043 A1    7/1976
DE    44 12 870 A1    10/1995
(Continued)

*Primary Examiner* — Christopher S Bobish
(74) *Attorney, Agent, or Firm* — Reinhart Boerner Van Deuren P.C.

(57) ABSTRACT

In order to improve a refrigerant compressor, including a compressor unit having a compressor housing and at least one compressor element that is arranged in the compressor housing, for compressing refrigerant, and further including a drive unit having a drive housing and an electric motor that is arranged in the drive housing and connector terminals that are arranged on the drive housing, for the electric motor, and further including an electronic functional unit, such that the connection between the refrigerant compressor and the electronic functional unit is achievable as simply as possible, it is proposed that the connector terminals should be provided in a housing that is arranged on the drive housing, and that an electronic functional unit which performs at least one compressor function should be provided in the housing.

5 Claims, 4 Drawing Sheets

(51) Int. Cl.
*H02K 5/22* (2006.01)
*F25B 49/02* (2006.01)
*F04B 39/12* (2006.01)
*F04B 51/00* (2006.01)
*H02K 11/33* (2016.01)

(52) U.S. Cl.
CPC ........... *F25B 49/022* (2013.01); *H02K 5/225* (2013.01); *H02K 11/33* (2016.01)

(58) Field of Classification Search
CPC .............. F04C 2270/18; F04C 2270/19; F04C 2270/24; F04C 2270/42; F04C 2270/44
USPC ........................................ 417/423.14; 310/71
See application file for complete search history.

(56) References Cited

U.S. PATENT DOCUMENTS

| | | | | |
|---|---|---|---|---|
| 3,509,438 A * | 4/1970 | Kachuk | ................ | H02K 17/30 310/66 |
| 5,475,985 A * | 12/1995 | Heinrichs | ............... | F04B 39/06 62/117 |
| 6,017,192 A * | 1/2000 | Clack | ...................... | F04B 49/02 417/13 |
| 6,041,609 A * | 3/2000 | Hornsleth | ............... | F04B 39/06 62/259.2 |
| 6,198,183 B1 * | 3/2001 | Baeumel | ................. | F04D 25/068 310/52 |
| 6,321,563 B1 * | 11/2001 | Ikeda | ...................... | F04B 49/06 184/6.16 |
| 6,564,576 B2 * | 5/2003 | Shibuya | ................. | F04C 23/008 62/259.2 |
| 6,704,202 B1 * | 3/2004 | Hamaoka | ............. | F25D 23/006 361/690 |
| 7,009,318 B2 * | 3/2006 | Iritani | ..................... | F04B 35/04 310/52 |
| 7,112,045 B2 * | 9/2006 | Kimura | .................. | F04B 35/04 310/52 |
| 7,199,496 B2 * | 4/2007 | Suzuki | .................. | H02K 11/33 310/52 |
| 7,207,187 B2 * | 4/2007 | Funahashi | ............... | F01C 21/10 62/113 |
| 7,473,080 B2 * | 1/2009 | Kawada | .................. | F04B 35/04 417/423.14 |
| 7,547,203 B2 * | 6/2009 | Dieterich | ................ | F04C 28/16 418/2 |
| 8,007,255 B2 * | 8/2011 | Hattori | ................. | B60H 1/3223 310/55 |
| 8,097,992 B2 * | 1/2012 | Toyama | .................. | F04B 35/04 310/64 |
| 8,118,564 B2 * | 2/2012 | Enami | ................. | F04C 18/3564 417/410.1 |
| 8,192,178 B2 * | 6/2012 | Nishii | .................... | F04C 23/008 417/410.3 |
| 8,278,864 B2 | 10/2012 | Powell | | |
| 8,299,662 B2 * | 10/2012 | Schmidt | ................. | H02K 11/33 310/52 |
| 8,451,611 B2 * | 5/2013 | Nakagami | ............. | F04B 39/06 165/104.33 |
| 8,546,984 B2 * | 10/2013 | Heilman | .................. | H02K 5/10 174/50.5 |
| 8,698,364 B2 * | 4/2014 | Saito | ...................... | F04B 39/121 310/68 A |
| 8,777,591 B2 * | 7/2014 | Cho | ....................... | F01C 17/066 417/366 |
| 8,829,747 B2 * | 9/2014 | Watanabe | ............... | F04B 35/04 310/71 |
| 9,341,187 B2 * | 5/2016 | Brostrom | .............. | F04C 29/021 |
| 9,480,177 B2 * | 10/2016 | Trudeau, Jr. | ............. | H05K 7/02 |
| 2002/0163785 A1 | 11/2002 | Brechbill et al. | | |
| 2003/0002998 A1 * | 1/2003 | Makino | ................. | F04C 23/008 417/374 |
| 2004/0009078 A1 * | 1/2004 | Kimura | ................... | F04B 35/04 417/410.5 |
| 2005/0235660 A1 * | 10/2005 | Pham | ...................... | F04C 28/00 62/126 |
| 2006/0064998 A1 * | 3/2006 | Funahashi | ............... | F01C 21/10 62/228.4 |
| 2006/0238388 A1 * | 10/2006 | Jayanth | ................... | F04B 49/10 341/51 |
| 2009/0010786 A1 * | 1/2009 | Koide | ..................... | F01C 21/10 417/423.14 |
| 2009/0071175 A1 | 3/2009 | Pham | | |
| 2010/0170294 A1 * | 7/2010 | Nakagami | ............. | F04C 23/008 62/505 |
| 2010/0172770 A1 * | 7/2010 | Ichise | ..................... | F04B 35/04 417/366 |
| 2011/0062809 A1 | 3/2011 | Watanabe et al. | | |
| 2011/0144944 A1 | 6/2011 | Pham | | |
| 2011/0264409 A1 | 10/2011 | Jayanth et al. | | |
| 2012/0186869 A1 * | 7/2012 | Hamer | ................. | H02K 11/022 174/382 |
| 2013/0119834 A1 * | 5/2013 | Nakagami | ............. | F04B 39/121 310/68 D |
| 2014/0065000 A1 * | 3/2014 | Tolbert, Jr. | .......... | F04C 18/0207 418/55.4 |

FOREIGN PATENT DOCUMENTS

| | | |
|---|---|---|
| DE | 203 20 643 U1 | 12/2004 |
| DE | 10 2012 102 405 A1 | 9/2013 |
| EP | 2 575 241 A2 | 4/2013 |
| KR | 20130102352 A | 9/2013 |

* cited by examiner

REFRIGERANT COMPRESSOR

CROSS-REFERENCE TO RELATED PATENT APPLICATION

This application is a continuation of International application number PCT/EP2015/073551 filed on Oct. 12, 2015.

This patent application claims the benefit of International application No. PCT/EP2015/073551 of Oct. 12, 2015 and German application No. 10 2014 114 837.1 of Oct. 13, 2014, the teachings and disclosure of which are hereby incorporated in their entirety by reference thereto.

BACKGROUND OF THE INVENTION

The invention relates to a refrigerant compressor, including a compressor unit having a compressor housing and at least one compressor element that is arranged in the compressor housing, for compressing refrigerant, and further including a drive unit having a drive housing and an electric motor that is arranged in the drive housing and connector terminals that are arranged on the drive housing, for the electric motor, and further including an electronic functional unit.

Refrigerant compressors of this kind are known from the prior art, and the electronic functional unit therein is conventionally provided as a separate unit independent of the refrigerant compressor, for example being part of a higher-level controller of a refrigeration unit, in which case making the connections between the refrigerant compressor and the electronic functional unit is a complex matter, since they cannot be taken into account by the manufacturer of the refrigerant compressor.

It is thus the object of the invention to improve a refrigerant compressor of the generic type such that the connection between the refrigerant compressor and the electronic functional unit is achievable as simply as possible.

SUMMARY OF THE INVENTION

This object is achieved according to the invention in the case of a refrigerant compressor of the type described in the introduction in that the connector terminals are provided in a housing that is arranged on the drive housing, and in that the electronic functional unit which performs at least one compressor function is provided in the housing.

The advantage of the solution according to the invention can thus be seen in the fact that it gives a compact solution that consists in integrating the electronic functional unit in the housing, which has in any case to be provided for the connector terminals, and thus making it possible for the electronic functional unit already to be connected to the refrigerant compressor by the manufacturer of the refrigerant compressor and delivered, fixedly installed, at the same time.

In this context, the most diverse possibilities are possible for the form taken by the housing.

Here, an advantageous solution provides for the housing to have a connector housing unit in which the connector terminals are arranged.

Further, it is preferably provided for the housing to have a controller housing unit in which the electronic functional unit is arranged.

Preferably in this case, it is provided for the connector housing unit and the controller housing unit to be individual modules of the housing, from which the housing can be assembled.

A particularly favourable solution provides for the connector housing unit to be arranged on the drive housing and thus to be able to be mounted already fixed to the drive housing.

Moreover, it is preferably provided for the controller housing unit to be arranged on the connector housing unit.

This means that the connector housing unit carries the controller housing unit.

A particularly favourable solution provides for the controller housing unit to be arranged on the connector housing unit on an opposite side thereof to the drive housing.

This provides the possibility of mounting the connector housing unit on the drive housing first and then, after the connector housing unit has been mounted, additionally mounting the controller housing unit on the connector housing unit.

In particular, this provides the possibility of arranging the connector housing unit and the controller housing unit above one another in the manner of stacking.

A particularly favourable solution provides for the controller housing unit to cover the connector housing unit, that is to say that in this case the controller housing unit can serve to cover the connector housing unit and to close it on the opposite side thereof to the drive housing.

It is particularly favourable if the controller housing unit is detachably connected to the connector housing unit.

This provides the possibility of making the necessary connections first in the connector housing unit, in particular with the connector terminals, and then of mounting the controller housing unit and connecting it to the corresponding units and/or sensors.

For example, the controller housing unit could be constructed such that it has its own cover.

In order to enable particularly simple mounting and simple wiring of the electronic functional unit in the controller housing unit to be achieved, it is preferably provided for the controller housing unit to be covered by a housing cover on a side remote from the connector housing unit.

More detailed statements have not been made in conjunction with the embodiments described hitherto as regards the compressor function to be performed by the electronic functional unit.

Here, a solution that is advantageous as an alternative or in addition to the embodiments described hitherto provides for the compressor function to be a parameter determining function and, in particular for performing the parameter determining function, for at least one of the function parameters such as temperature of the electric motor, voltage across the electric motor, current consumption of the electric motor, lubricant temperature, lubricant differential pressure, lubricant level, incoming pressure of the refrigerant, incoming temperature of the refrigerant, outgoing pressure of the refrigerant and outgoing temperature of the refrigerant to be determined.

A determination of the function parameters of this kind enables sufficient information on the respective operating state of the compressor to be obtained.

This solution is also particularly advantageous because, as a result, the pathways for determining the function parameters of the electric motor and also the further function parameters of the refrigerant compressor are very short.

In particular, damage to the compressor can be avoided by performing one or more protective functions.

In this case, it is preferably provided for the compression function to be a protective function that compares the at least one function parameter that has been determined in the parameter determining function with at least one reference parameter, and in the event of the at least one reference parameter being exceeded or not reached brings about a switch-off of the refrigerant compressor in order to avoid damage thereto.

Moreover, as an alternative or in addition, preferably further compressor functions for operating the refrigerant compressor are advantageous.

Here, a further advantageous solution provides for the compressor function to be a control function and, in particular for performing the control function, for at least one of the units such as a lubricant heater, a supplementary fan, a control element for the compressor output, an injection element for compressed refrigerant for supplementary cooling, in particular for injecting liquid refrigerant, preferably into an intake channel and/or on the high pressure side in the region of a valve plate or a high-pressure chamber, and/or a motor controller to be controlled.

In the case of controlling the motor, for example a motor start-up controller and/or the motor itself are controlled in respect of its speed of rotation, for example if the electronic functional unit includes a frequency converter.

These additional control functions provide the possibility of operating the refrigerant compressor in optimum manner within the given application limits.

A further advantageous solution provides for the compressor function to be an operating state monitoring function and, in particular for performing the operating state monitoring function, for the performance of at least one parameter determining function and/or at least one protective function and/or at least one control function to be recorded.

Recording such functions in this manner provides the possibility of monitoring the operating states of the refrigerant compressor according to the invention throughout operation thereof, and also detecting whether the respective permitted operating states are exceeded briefly or indeed detecting whether the respective application limits are exceeded in an operating diagram.

Preferably, it is provided here for recording of the at least one function parameter and/or performing of at least one protective function and/or performing of the at least one control function to take place over time.

In order, using the refrigerant compressor according to the invention, to enable communication also with further external devices, it is preferably provided for the electronic functional unit to be provided with a communication unit for exchanging data with external devices.

A communication unit of this kind may take a form such that it exchanges data either in a hard-wired arrangement or wirelessly.

Moreover, it is preferably provided for the electronic functional unit to be provided with at least one indicator element that indicates at least one performance state of a compressor function or the result thereof.

Further features and advantages of the invention form the subject matter of the description below and the representation in the drawing of an exemplary embodiment.

DETAILED DESCRIPTION OF THE INVENTION

Figure 1:
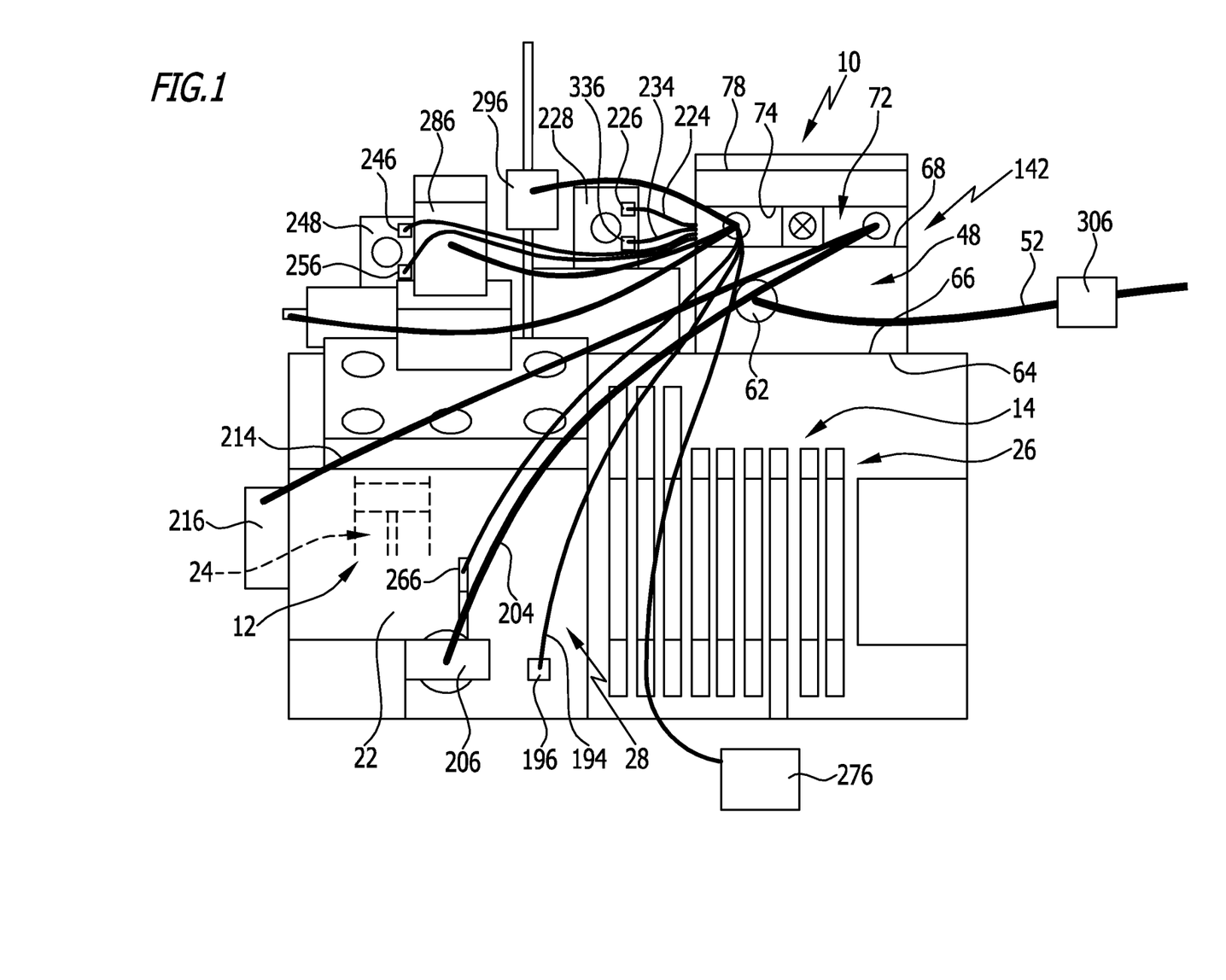
FIG. 1 shows a diagrammatic side view of a refrigerant compressor according to the invention.

An exemplary embodiment of a refrigerant compressor according to the invention, which is designated 10 as a whole, illustrated in FIG. 1, includes a compressor unit 12 and a drive unit 14 for driving the compressor unit 12.

Here, the compressor unit 12 is arranged in a compressor housing 22 and includes at least one compressor element 24 for the refrigerant, for example taking the form of a piston-and-cylinder element. Moreover, the drive unit 14 is arranged in a drive housing 26, wherein preferably the compressor housing 22 and the drive housing 26 form parts of an overall housing 28 of the compressor unit 10.

Figure 2:
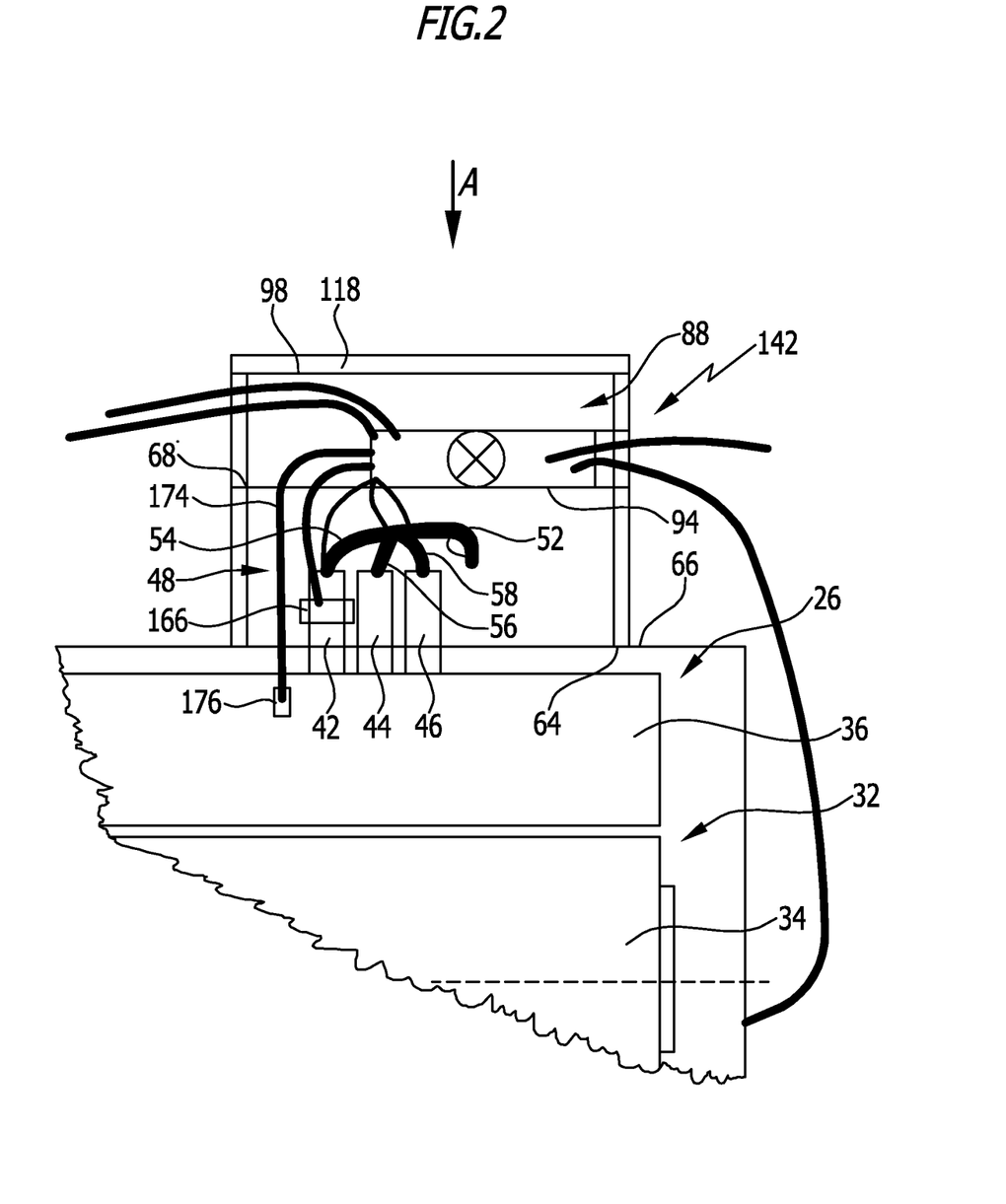
FIG. 2 shows a detail of a longitudinal section through a housing according to the invention and a drive unit carrying this housing.

As illustrated schematically in FIG. 2, the drive unit 14 includes in particular an electric motor that is designated 32 as a whole and has a rotor 34 and a stator 36 surrounding the rotor 34, wherein the stator 36 is arranged to be stationary in the drive housing 26.

As illustrated in FIG. 2, the stator 34 is provided with a set of connector terminals 42, 44, 46 that are guided out of the drive housing 26 and project into a connector housing unit 48 that is placed on the drive housing 26.

Within the connector housing unit 48 a connection is made between a motor feed cable that is designated 52 as a whole and has for example three phases 54, 56, 58, wherein each of the phases 54, 56, 58 is connected to one of the connector terminals 42, 44, 46 within the connector housing unit 48, and the motor feed cable 52 is guided out of the connector housing unit 48 by means of a cable lead-through 62.

Figure 3:
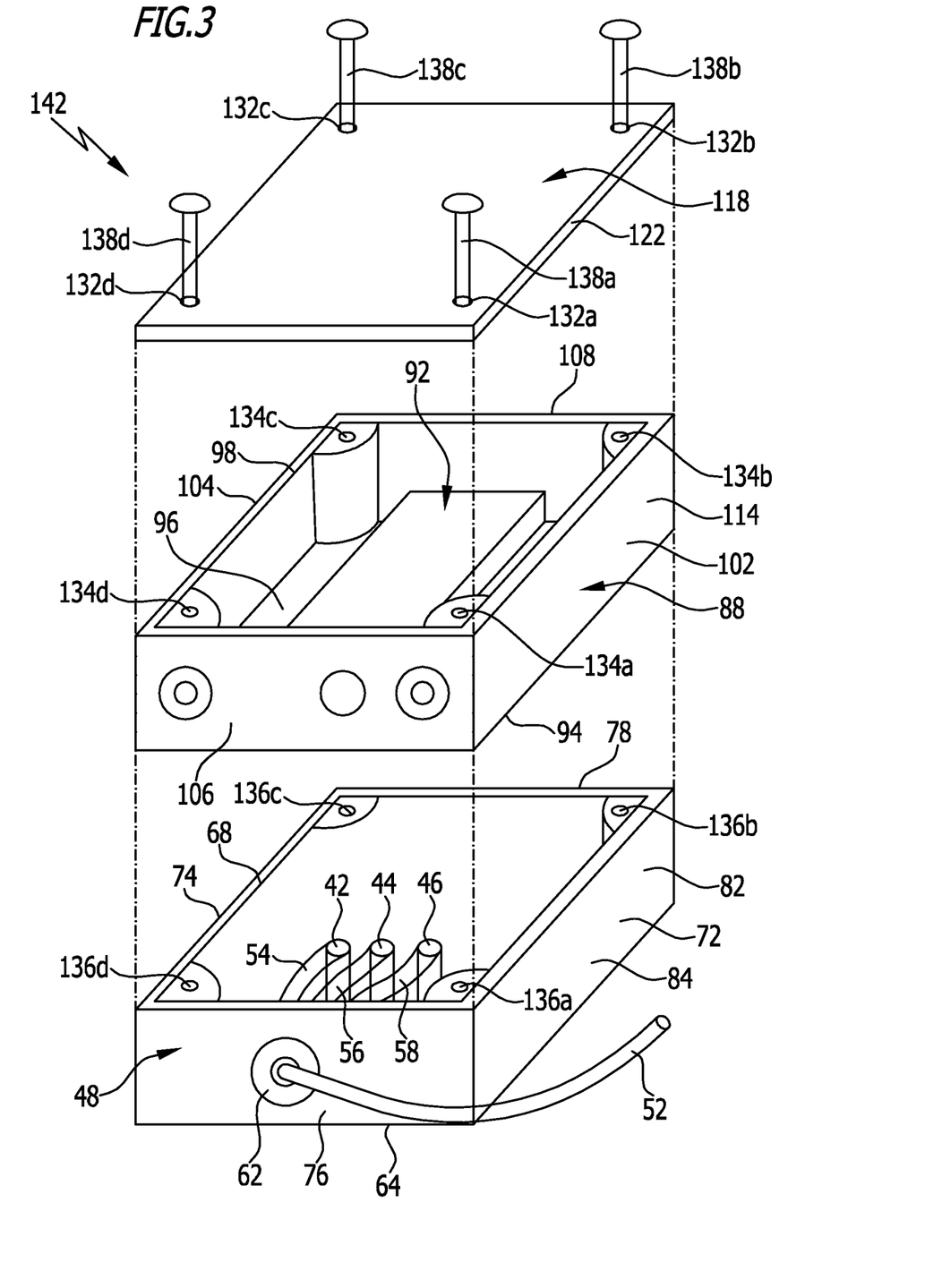
FIG. 3 shows a perspective exploded illustration of a housing of modular construction, including a connector housing unit and a controller housing unit and a cover.

As illustrated in FIGS. 1, 2 and 3, the connector housing unit 48 is seated with one mounting side 64 directly on a mounting surface 66 formed by the drive housing 26, and is connected to the drive housing 26.

The connector housing unit 48 further has an access side 68, opposite the mounting side 64, through which the connections between the connector terminals 42, 44, 46 and the phases 54, 56, 58 are accessible, as illustrated in FIGS. 2 and 3.

In particular, the connector housing unit 48 includes for example four housing outer walls 72, 74, 76 and 78 that rise above the mounting side 64, wherein the housing outer walls 72 and 74 and the housing outer walls 76 and 78 in each case extend parallel to one another such that they form a housing frame that is designated 82 as a whole, has a preferably rectangular external contour 84, rises between the mounting side 64 and the access side 68 and is accessible in particular from the access side 68.

Preferably, the mounting side 64 and the access side 68 extend in mutually parallel planes, with the result that the housing frame 82 rises above the mounting side 64 to the access side 68 by an extent that is the same on all sides.

A controller housing unit that is designated 88 as a whole is placeable on the connector housing unit 48.

The controller housing unit 88 includes an electronic functional unit 92 for performing one or more different compressor functions, such as protective, monitoring, controlling, diagnostic, communication and regulating functions, which will be described in more detail below by way of example.

The controller housing unit 88 itself has a mounting side 94 and extends as far as an access side 98, wherein a carrier base 96 is arranged between the mounting side 94 and the access side 98, preferably lies close to the mounting side 94 and carries the electronic functional unit 92.

The controller housing unit 88 also includes housing outer walls 102, 104, 106 and 108, wherein preferably the housing outer walls 102 and 104, and the housing outer walls 106 and 108, extend parallel to one another and thus form a rectangular housing frame 112.

Preferably, the housing frame 112 of the controller housing unit 88 takes a form such that its external contour 114, which is for example rectangular, is identical with the external contour 84 of the housing frame 82, with the result that the housing frame 112 is placeable with the mounting side 94 congruently on the housing frame 82, wherein the mounting side 94 entirely covers the access side 68 of the connector housing unit 48.

Preferably, the access side 68 of the connector housing unit 48 and the mounting side 94 of the controller housing unit 88 are also provided with positively-locking elements, with the result that the housing frame 112 of the controller housing unit 88 is fixable on the housing frame 82 of the connector housing unit 48 in the placed-on position with positive engagement, to prevent movements in the plane defined by the access side 68.

In the case of the controller housing unit 88 as well, the mounting side 94 and the access side 98 preferably lie in mutually parallel planes, with the result that the housing frame 112 rises from the mounting side 94 to the access side 98 by an extent that is the same on all sides.

Further, the controller housing unit 88 is also closable on its access side 98 by a cover 118 that extends over the entire access side 98 of the controller housing unit 88 and preferably has an external contour 122 that corresponds to the external contour 114 of the controller housing unit 88.

In the solution according to the invention, when the controller housing unit 88 is in the state placed on the connector housing unit 48, it is detachably fixable thereto, and moreover the cover 118 is detachably fixable at least to the controller housing unit 88.

This is achieved for example in that the cover 118 has screw holes 132a, 132b, 132c and 132d which are arranged coaxially with screw channels 134a, 134b, 134c and 134d in the controller housing unit 88, and these screw channels 134 are in turn arranged coaxially with threaded bores 136a, 136b, 136c and 136d.

In this way, screws 138a, 138b, 138c and 138d may be passed through the screw holes 132 and the screw channels 134 and screwed into the threaded bores 136, with the result that the cover 118 is fixable on the controller housing unit 88 by the screws 138 and at the same time the controller housing unit 88 is in turn fixable, together with the cover 118, on the connector housing unit 48.

In the refrigerant compressor 10 according to the invention, the connector housing unit 48, the controller housing unit 88 and the cover 118 form a housing unit 142 of modular construction, wherein the connector housing unit 48 and the controller housing unit 88 and the cover 118 each represent a module of this housing unit 142.

This provides the possibility for example that a refrigerant compressor 10 that is equipped only with a connector housing unit 48 covered by the cover 118 on its access side 68 may in addition be retrofitted with an electronic functional unit 92 that is arranged in the controller housing unit 88, by removing the cover 118, and that this controller housing unit 88 may itself be closed on its access side 98 by the cover 118 that has been removed from the connector housing unit 48.

Figure 4:
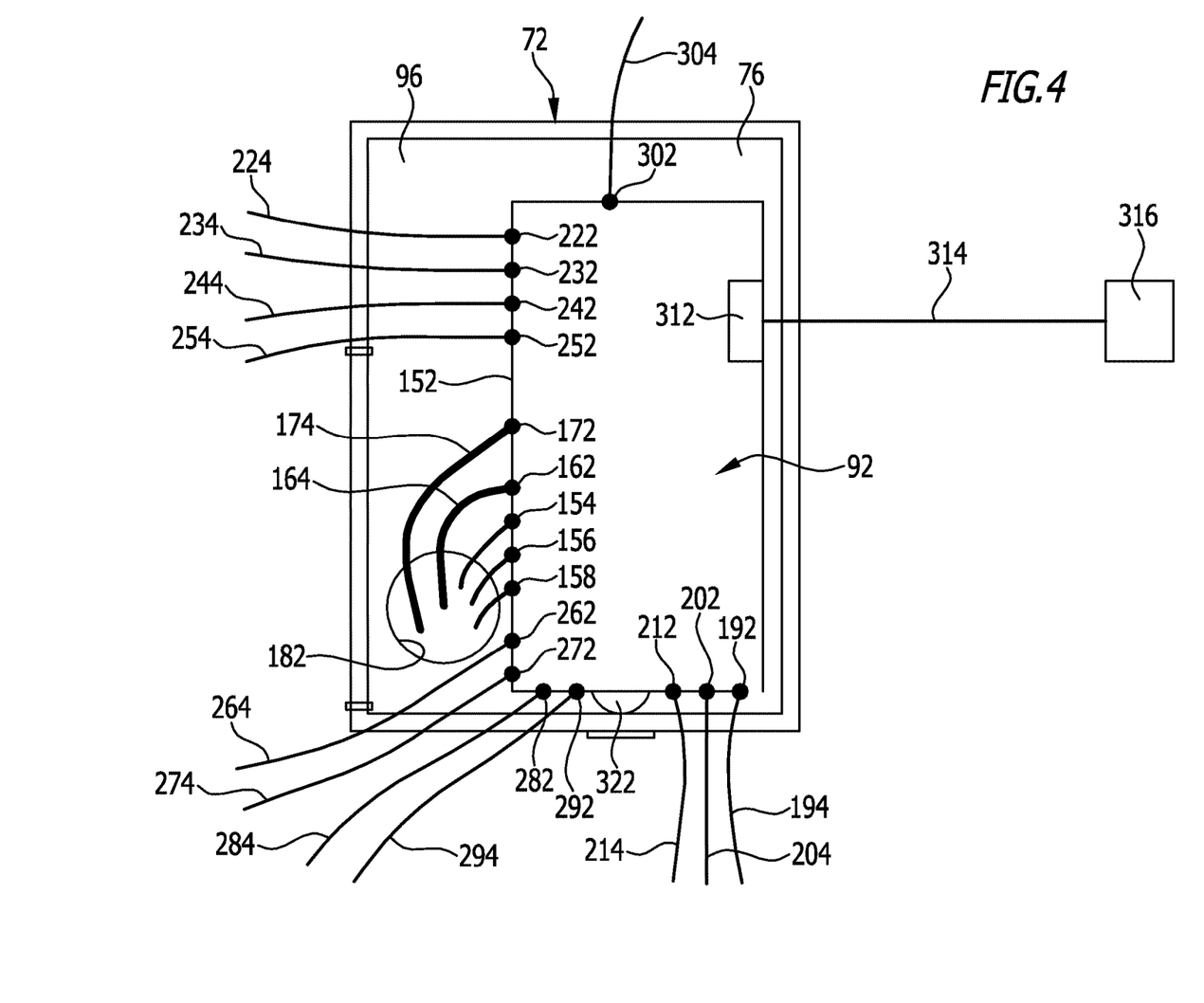
FIG. 4 shows a plan view of the controller housing unit according to the invention with the cover removed, in the direction of the arrow A in FIG. 2.

For the purpose of explaining the various possible compressor functions that may be determined and/or monitored and/or controlled by the electronic functional unit 92, various possibilities are illustrated by way of example in FIGS. 1, 2 and 4, wherein the exemplary illustration of various compressor functions is given merely by way of example, so not all such compressor functions have necessarily to be embodied in the construction of the control unit according to the invention, and the compressor functions that are illustrated may also be supplemented by further compressor functions.

The electronic functional unit 92 performs by way of example, as a compressor function, a parameter determining function in which at least one function parameter, preferably a plurality of function parameters, are determined.

Here, for example, the electronic functional unit 92 is to be provided on a connector side 152 with inputs 154, 156 and 158 for determining the voltages across the connector terminals 42, 44, 46, with the result that corresponding lines lead from the inputs 154, 156 and 158 to the connector terminals 42, 44, 46 in order to determine the voltages UM across these connector terminals 42, 44, 46 as a function parameter.

Further, the connector side 152 is also provided with an input 162 for a current signal from which a line 164 leads to a current sensor 166 that surrounds for example one of the connector terminals 42, 44, 46 and determines a magnetic field generated by the current IM that flows through the surrounded connector terminal 42 and, depending on the magnetic field, transmits a signal representing the current through this connector terminal 42 to the input 162 of the electronic functional unit 92.

Further, the electronic functional unit 92 is for example also provided at the connector side 152 with an input 172 for an item of information on the motor temperature TM, with the result that a line 174 leads from the input 172 to a temperature sensor 176 that is associated for example with the stator 36 in order to determine a temperature of the stator 36 and to transmit to the input 172 of the electronic functional unit 92 a value for the temperature or merely a signal representing a permitted or impermissible, in particular excessively high, motor temperature.

All the lines leading to the inputs 154, 156, 158 and the inputs 162 and 172 are guided through an aperture 182 in the carrier base 96, directly from the controller housing unit 88 into the connector housing unit 48, and there are either connected to the connector terminals 42, 44, 46 or, in the case of the temperature sensor 176, are guided through the connector housing unit 48 directly to a current lead-through element or to the stator 36.

Further, it is possible to guide through the aperture 182 a line for any required heating for the purpose of preventing condensation.

On the basis of the signals present at the inputs 154, 156 and 158 and 162 and 172, the electronic functional unit 92 is thus able to determine and monitor the function of the electric motor 32 and where appropriate to respond to overload states.

Moreover, as illustrated in FIG. 4, the electronic functional unit 92 is also provided with an input 192 for a lubricant temperature TS as a function parameter, from which a line 194 leads to a temperature sensor 196 that determines a temperature of a lubricant, in particular a lubricant bath, in the compressor housing 22.

Further, the electronic functional unit 92 is provided with an input 202 from which a line 204 leads to a sensor 206 for the lubricant level NS as a function parameter, in order to determine whether there is sufficient lubricant in a lubricant supply and/or in the lubricant bath.

Moreover, the electronic functional unit 92 is also provided with an input 212 from which a line 214 leads to a pressure difference sensor 216 in order to determine a lubricant pressure PS as a function parameter, preferably by measuring a pressure differential, for example at a lubricant pumping unit.

Further, the electronic functional unit 92 is also provided with an input 222 for a value of an input pressure PE of the refrigerant, from which a line 224 leads to a pressure sensor 226 that is associated with an intake connector 228 of the refrigerant compressor 10 and thus determines the pressure in the intake connector 228.

Further, the electronic functional unit 92 is also provided with an input 232 for determining an incoming temperature TE of the refrigerant, wherein a line 234 leads from the input 232 to a temperature sensor 336 that is likewise associated with the intake connector 228 of the refrigerant compressor.

The electronic functional unit 92 is further also provided with an input 242 for determining an outgoing pressure PA of the refrigerant, wherein a line 244 leads from this input 242 to a pressure sensor 246 that is associated for example with a pressure connector 248 of the refrigerant compressor 10.

As an alternative or in addition to the pressure sensor 246 for the outgoing pressure PA, it is also possible to provide a high-pressure switch which, in the event of a predetermined pressure being exceeded, causes the electronic functional unit 92 to switch off the refrigerant compressor 10 for the purpose of protection.

Moreover, the electronic functional unit 92 is provided with an input 252 for an outgoing temperature TA of the refrigerant at the pressure connector 248, wherein a line 254 leads from this input 252 to a temperature sensor 256 that is associated with the pressure connector 248 and determines the temperature of the refrigerant for example at the pressure connector 248.

Thus, as a result of the signals applied across the inputs 222, 232, 242 and 252, the electronic functional unit 92 is able to determine as function parameters the pressure and temperature of the refrigerant, as the latter enters the compressor unit, for example by way of the intake connector 228, and as it leaves the refrigerant compressor, for example by way of the pressure connector 248.

This provides the possibility, within the scope of performing a protective function, of comparing the respective function parameters with reference values and thus, in the event that the reference values are exceeded or not reached, of intervening using control measures or where appropriate, in an extreme case, of switching off the refrigerant compressor.

The electronic functional unit 92 is, however, also provided with a plurality of outputs for performing control functions as compressor functions.

For example, an output 262 is provided from which a line 264 leads to a lubricant heater 266 that is arranged in the compressor housing 22, in order to heat up the lubricant provided therein by suitable control of the lubricant heater 266 by means of one of the control functions.

A further output 272 serves to control, by way of a line 274 and by means of one of the control functions, a supplementary fan 276 that serves to supplement cooling of a refrigerant circuit at one or more points and/or of the refrigerant compressor.

An output 282 serves to control, by way of a line 284 and by means of one of the control functions, at least one control element for the compressor output, for example a power regulating valve 286, in order to control the compressor output.

Further, an output 292 serves to control, by way of a line 294 and by means of one of the control functions, an injection element 296 that serves to inject refrigerant under high pressure into the refrigerant compressor, in order either to achieve a supplementary cooling effect in the region of the compressor element or of the electric motor 32 for cooling in the region thereof.

Preferably, in addition application limits of the specific refrigerant compressor 10 and parameters of the refrigerant are also predetermined for the electronic functional unit 92 for the purpose of performing an operation monitoring function, with the result that, taking into account function parameters that are determined at the inputs 154, 156, 158, 162, 172, 182, 192, 202, 212, 222, 232, 242 and 252 of whether the refrigerant compressor is operating in a permitted operating state or outside a permitted operating state of this kind and as a result of the units controlled by way of the outputs 262, 272, 282 and 292, where appropriate these ensure observation of the application limits.

Further, the electronic functional unit is provided with an output 302 by way of which it is controllable, as one of the control functions, by means of a line 304 to a motor controller 306 that serves to control the electric motor 32 in a suitable manner during start-up and/or in the respective operating states, depending on the construction thereof.

The motor controller 306 may also at the same time be used for switching off the electric motor 32 in the event of at least one reference parameter being exceeded or not reached, in which case a protective function is performed.

Moreover, the electronic functional unit 92 is also provided with a communication unit 312 that is provided for the purpose of communicating with the external devices 316, for example higher-level unit controllers.

Here, communication with a unit controller 316 may either be hard-wired, by way of a line 314 such as a Modbus, or wireless over conventional communications protocols such as Bluetooth or W-LAN.

Moreover, the electronic functional unit 92 is also provided with an indicator element 322 that is able to indicate at least one status or the result of a compressor function.

A status of this kind of a compressor function may be for example the indication of function parameters and/or of permitted operating states and/or the indication of a triggered protective function and/or the indication of a control function and/or the indication of a malfunction, in particular in combination with the type of malfunction, and/or a combination thereof.

The indication may take place by way of an indicator element 322 that is provided on the housing, or indeed by way of a hard-wired or wireless communication path to a fixed or portable indicator unit such as a computer or a portable communication device.

The invention claimed is:

1. A refrigerant compressor, including a compressor unit having a compressor housing and at least one compressor element that is arranged in the compressor housing, for compressing refrigerant, and further including a drive unit having a drive housing and an electric motor comprising a rotor and a stator that is arranged in the drive housing and connector terminals for the electric motor that are connected to said stator and arranged on the drive housing, and extending with outer ends beyond an outer side of said drive housing, and further including an electronic functional unit, the outer ends of the connector terminals are provided in a housing that is mounted on the outer side of the drive housing, and the electronic functional unit, which performs at least one compressor function, is provided in the housing, the housing having a connector housing unit in which the outer ends of the connector terminals are arranged, the housing has a controller housing unit in which the electronic functional unit is arranged, the connector housing unit being arranged on the drive housing and having au open access side opposite to said drive housing, the controller housing unit is arranged on the connector housing unit on an opposite side thereof to the drive housing, the controller housing unit covering the open access side of the connector housing unit, the controller housing unit having a mounting side for mounting on said access side of said connector housing unit and, extending from said mounting side to an access, side remote from said connector housing unit and further having a carrier bottom arranged between said mounting side and said access side said carrier bottom carrying said electric functional unit and the controller housing unit is covered by a removable cover on said access side, said removable cover enabling access to said controller housing unit.

2. A refrigerant compressor according to claim 1, wherein the controller housing unit is detachably connected to the connector housing unit.

3. A refrigerant compressor according to claim 1, wherein the electronic functional unit is provided with a communication unit for exchanging data with external devices being higher level unit controllers.

4. A refrigerant compressor according to claim 3, wherein the communication unit exchanges the data in a hard-wired arrangement or wirelessly.

5. A refrigerant compressor according to claim 1, wherein the electronic functional unit is provided with at least one indicator element that indicates at least one performance state of a compressor function or the result thereof.

* * * * *

UNITED STATES PATENT AND TRADEMARK OFFICE
CERTIFICATE OF CORRECTION

PATENT NO. : 10,914,301 B2  
APPLICATION NO. : 15/485955  
DATED : February 9, 2021  
INVENTOR(S) : Henrik Thomsen Schmidt et al.

Page 1 of 1

It is certified that error appears in the above-identified patent and that said Letters Patent is hereby corrected as shown below:

In the Claims

Claim 1, Line 20, delete "housing and having au open access side opposite to said" and insert
-- housing and having an open access side opposite to said --

Claim 1, Line 27, delete "housing unit and, extending from said mounting side to" and insert
-- housing unit and extending from said mounting side to --

Claim 1, Line 28, delete "an access, side remote from said connector housing unit" and insert -- an access side remote from said connector housing unit --

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*